United States Patent
Katoh et al.

(10) Patent No.: US 8,427,463 B2
(45) Date of Patent: Apr. 23, 2013

(54) LIQUID CRYSTAL DISPLAY DEVICE

(75) Inventors: Hiromi Katoh, Osaka (JP); Kazuhiro Maeda, Osaka (JP); Christopher Brown, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 752 days.

(21) Appl. No.: 12/594,995

(22) PCT Filed: Apr. 9, 2008

(86) PCT No.: PCT/JP2008/057029
§ 371 (c)(1),
(2), (4) Date: Oct. 7, 2009

(87) PCT Pub. No.: WO2008/126871
PCT Pub. Date: Oct. 23, 2008

(65) Prior Publication Data
US 2010/0110053 A1    May 6, 2010

(30) Foreign Application Priority Data
Apr. 9, 2007  (JP) ................................. 2007-102135

(51) Int. Cl.
*G09G 5/00*  (2006.01)

(52) U.S. Cl.
USPC .......................................... 345/207; 345/173

(58) Field of Classification Search ..................... 345/87, 345/173, 207; 348/294; 250/208.1; 257/291, 257/292
See application file for complete search history.

(56) References Cited

U.S. PATENT DOCUMENTS

| 6,486,912 | B1 * | 11/2002 | Aizawa et al. | 348/308 |
| 6,507,365 | B1 * | 1/2003 | Nakamura et al. | 348/296 |
| 7,164,164 | B2 | 1/2007 | Nakamura et al. | |
| 7,746,394 | B2 * | 6/2010 | Sugiyama | 348/272 |
| 2005/0093851 | A1 | 5/2005 | Nakamura et al. | |
| 2005/0212916 | A1 | 9/2005 | Nakamura et al. | |
| 2006/0033729 | A1 * | 2/2006 | Yoshida et al. | 345/207 |
| 2006/0262110 | A1 | 11/2006 | Fukuda et al. | |
| 2007/0091191 | A1 * | 4/2007 | Oike | 348/294 |

OTHER PUBLICATIONS

International Search Report for PCT/JP2008/057029, mailed May 13, 2008.

* cited by examiner

*Primary Examiner* — Tom Sheng
(74) *Attorney, Agent, or Firm* — Nixon & Vanderhye P.C.

(57) ABSTRACT

A liquid crystal display device having an image input function capable of suppressing the degradation of image quality of a display image and a captured image caused by a parasitic capacitance is provided. The liquid crystal display device, which includes an active matrix substrate (1), a counter substrate (2), and a liquid crystal layer and performs inversion driving, includes a photodetection part provided on the matrix substrate (1) for each or at least two of the active elements, and a sensor drive part (5). The photodetection part includes a photodiode and a capacitance storing charge, and outputs a photodetective signal VSOUT whose level changes in accordance with the amount of the stored charge. The sensor drive part (5) outputs, to the photodetection part, a reset signal that resets the charge in the capacitance and a reading signal that causes the photodetection part to output a photodetective signal during a period in which the polarity is set to be a predetermined one, and a current supplied to the active elements does not vary after the completion of the inversion of the polarity.

9 Claims, 5 Drawing Sheets

LIQUID CRYSTAL DISPLAY DEVICE

This application is the U.S. national phase of International Application No. PCT/JP2008/057029, filed 9 Apr. 2008, which designated the U.S. and claims priority to Japanese Application No. 2007-102135, filed 9 Apr. 2007, the entire contents of each of which are hereby incorporated by reference.

TECHNICAL FIELD

The present invention relates to a liquid crystal display device, and in particular, to a liquid crystal display device having an image input function.

BACKGROUND ART

A liquid crystal display device has been adopted widely as a display device for a computer, a mobile phone, a PDA, and a game machine due to the features such as power saving, thinness, and light weight. Generally, the liquid crystal display device includes a liquid crystal display panel and a backlight illuminating the liquid crystal display panel from a back surface thereof. The liquid crystal display panel has a configuration in which a liquid crystal layer is interposed between an active matrix substrate and a counter substrate.

The active matrix substrate includes a glass substrate on which a plurality of pixels including TFTs and pixel electrodes are formed. A plurality of the pixels are arranged in a matrix. A counter substrate includes a glass substrate on which a counter electrode and a color filter are formed. The color filter has coloring layers corresponding the respective pixels.

Due to such a configuration, in the liquid crystal display device, a voltage applied between each pixel electrode and the counter electrode is adjusted, whereby the transmittance of the liquid crystal layer is adjusted for each pixel. Then, an image is displayed on a display screen by illumination light of the backlight, transmitted through the liquid crystal layer.

In recent years, the liquid crystal display device may have a function of capturing an image, in addition to the function of displaying an image (see, for example, JP 2006-3857 A). In the liquid crystal display device disclosed by JP 2006-3857 A, a liquid crystal display panel has a plurality of photodiodes and peripheral circuits for each pixel on an active matrix substrate.

The photodiode outputs an electric signal in accordance with the amount of incident light. The peripheral circuit is provided for each photodiode and has a capacitance. Each peripheral circuit, for example, allows charge to be stored in the capacitance in accordance with the level of an electric signal output by the photodiode, and generates a photodetective signal whose voltage level varies depending upon the amount of the stored charge. Alternatively, each peripheral circuit causes the capacitance to discharge the stored charge in accordance with the level of an electric signal output by the photodiode, and generates a photodetective signal whose voltage level varies depending upon the amount of charge remaining in the capacitance. Furthermore, each peripheral circuit outputs the photodetective signal to a detection circuit provided outside of a display area through a reading line extending in a direction perpendicular to the screen.

The detection circuit collects signals output from the respective peripheral circuits to generate image data, subjects the image data to image processing, and outputs the resultant image data outside. Thus, in the liquid crystal display device disclosed by 2006-3857 A, the image of an object present on an observer side of the display surface of the liquid crystal display panel can be captured.

DISCLOSURE OF INVENTION

Problem to be Solved by the Invention

In the liquid crystal display device disclosed by JP 2006-3857 A, the peripheral circuits are provided in a display area in which pixels are formed, together with the photodiodes. Therefore, the peripheral circuits are placed close to elements constituting pixels, wiring, and a counter electrode to form a parasitic capacitance between the peripheral circuits, and the elements, wiring and the counter electrode. Particularly when the amount of stored charge varies, such a parasitic capacitance may influence the operations of the pixels, the photodiodes, and the peripheral circuits to degrade the image quality of a displayed image or a captured image.

The object of the present invention is to solve the above-mentioned problem, and provide a liquid crystal display device having an image input function capable of suppressing the degradation in image quality of a displayed image and a captured image caused by a parasitic capacitance.

Means for Solving Problem

In order to achieve the above object, a first liquid crystal display device of the present invention includes an active matrix substrate on which a plurality of sets of active elements and pixel electrodes are placed in a matrix, a counter substrate on which a counter electrode is placed, and a liquid crystal layer interposed between the two substrates, and performs inversion driving in which a polarity of a voltage applied to the liquid crystal layer is inverted for each predetermined period. The first liquid crystal display device includes a photodetection part provided on the active matrix substrate for each or at least two of the active elements, and a drive part. The photodetection part includes a photodiode that receives light incident through the counter substrate and the liquid crystal layer and outputs an electric signal in accordance with an amount of the received light, and a capacitance that stores charge in accordance with the electric signal, and outputs a photodetective signal whose level changes in accordance with an amount of the stored charge, and the drive part outputs, to each photodetection part, a reset signal that resets the charge stored in the capacitance and a reading signal that causes the photodetection part to output the photodetective signal during a period in which the polarity is set to be a predetermined one, and a current supplied to the active elements does not vary after a completion of the inversion of the polarity.

Furthermore, in order to achieve the above object, a second liquid crystal display device of the present invention includes an active matrix substrate on which a plurality of active elements are placed in a matrix, a counter substrate opposed, to the active matrix substrate, and a liquid crystal layer interposed between the two substrates, and performs inversion driving in which a polarity of a voltage applied to the liquid crystal layer is inverted for each predetermined period. The second liquid crystal display device includes a photodetection part and a drive part provided on the active matrix substrate for each or at least two of the active elements, and a drive part. The photodetection part includes a photodiode that receives light incident through the counter substrate and the liquid crystal layer and outputs an electric signal in accordance with an amount of the received light, and a capacitance that stores charge in accordance with the electric signal, and outputs a photodetective signal whose level changes in accordance with the amount of the stored charge, and the drive part outputs, to each photodetection part, a reset signal that resets the charge stored in the capacitance and a reading signal that causes the photodetection part to output the photodetective signal so that, when the polarity is set to be a predetermined one, an output of the photodetective signal from the photodetection part is completed before the inversion of the polarity to the other one is started.

Effects of the Invention

As described above, in the liquid crystal display device of the present invention, the drive of photodetection parts is limited so as not to cause a parasitic capacitance formed by the photodetection parts to adversely influence the pixels and the photodetection parts. Therefore, according to the present invention, the degradation in image quality of a displayed image and a captured image caused by the parasitic capacitance is suppressed.

DESCRIPTION OF THE INVENTION

Figure 1:
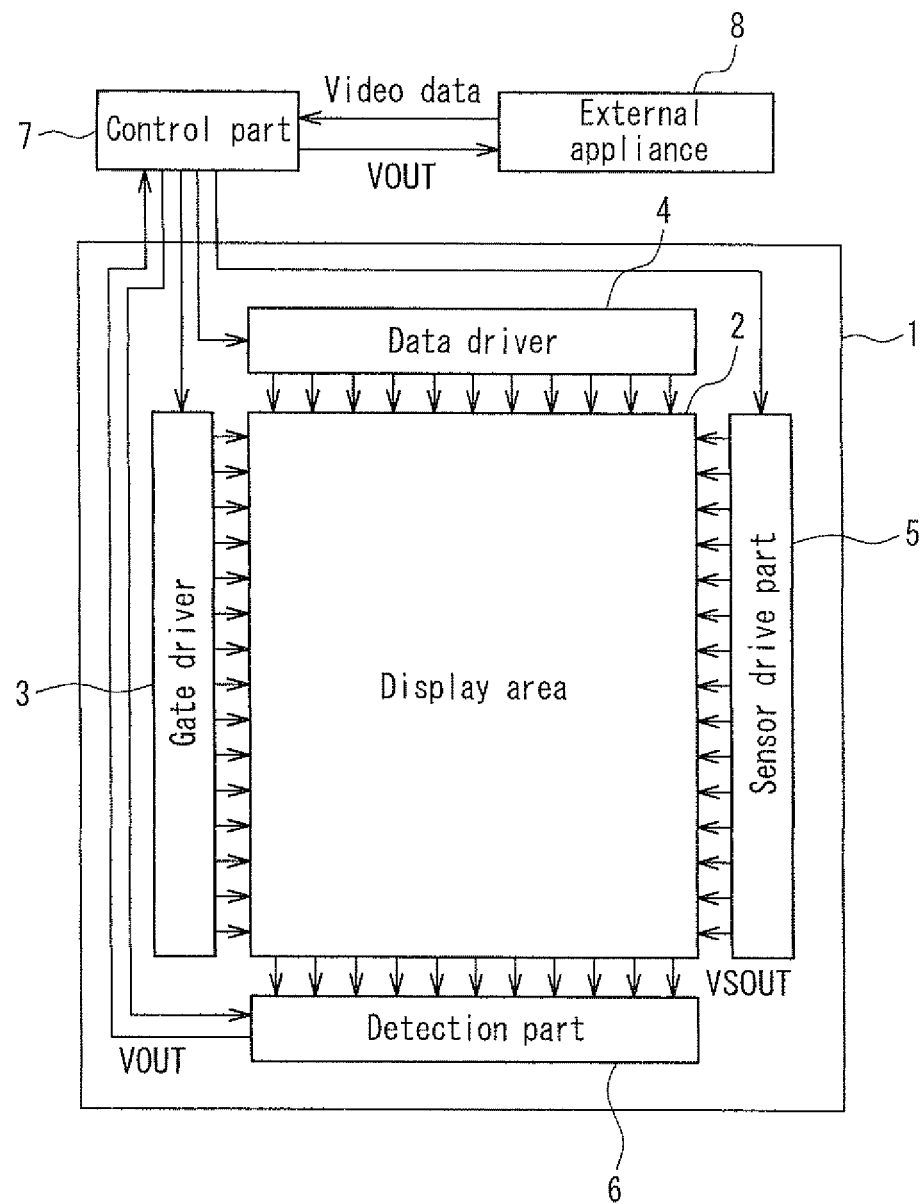
FIG. 1 is a diagram schematically showing the entire configuration of a liquid crystal display device in an embodiment of the present invention.

A first liquid crystal display device of the present invention includes an active matrix substrate on which a plurality of sets of active elements and pixel electrodes are placed in a matrix, a counter substrate on which a counter electrode is placed, and a liquid crystal layer interposed between the two substrates, and performs inversion driving in which a polarity of a voltage applied to the liquid crystal layer is inverted for each predetermined period. The first liquid crystal display device includes a photodetection part provided on the active matrix substrate for each or at least two of the active elements, and a drive part. The photodetection part includes a photodiode that receives light incident through the counter substrate and the liquid crystal layer and outputs an electric signal in accordance with an amount of the received light, and a capacitance that stores charge in accordance with the electric signal, and outputs a photodetective signal whose level changes in accordance with the amount of the stored charge, and the drive part outputs, to each photodetection part, a reset signal that resets the charge stored in the capacitance and a reading signal that causes the photodetection part to output the photodetective signal during a period in which the polarity is set to be a predetermined one, and a current supplied to the active elements does not vary after a completion of the inversion of the polarity.

In the first liquid crystal display device, it is preferred that the drive part further outputs the reset signal and the reading signal to each photodetection part so that an output of the photodetective signal from the photodetection part is completed before the inversion of the polarity to the other one is started. According to this aspect, the output of the signal from the photodetection part is stopped during a period from the start to the end of the inversion of the polarity. Therefore, the degradation in image quality of a display image and a captured image by a parasitic capacitance is suppressed further.

Furthermore, a second liquid crystal display device of the present invention includes an active matrix substrate on which a plurality of active elements are placed in a matrix, a counter substrate opposed to the active matrix substrate, and a liquid crystal layer interposed between the two substrates, and performs inversion driving in which a polarity of a voltage applied to the liquid crystal layer is inverted for each predetermined period. The second liquid crystal display device includes a photodetection part provided on the active matrix substrate for each or at least two of the active elements, and a drive part. The photodetection part includes a photodiode that receives light incident through the counter substrate and the liquid crystal layer and outputs an electric signal in accordance with an amount of the received light, and a capacitance that stores charge in accordance with the electric signal, and outputs a photodetective signal whose level changes in accordance with the amount of the stored charge, and the drive part outputs, to each photodetection part, a reset signal that resets the charge stored in the capacitance and a reading signal that causes the photodetection part to output the photodetective signal so that, when the polarity is set to be a predetermined one, an output of the photodetective signal from the photodetection part is completed before the inversion of the polarity to the other one is started.

In the above first and second liquid crystal, display devices, when a detection part that is provided on the active matrix substrate and detects the photodetective signal output from the photodetection part is provided on the active matrix substrate, the detection part generates an image signal from the detected photodetective signal, and outputs the image signal to an external appliance during a period that does not overlap a period from a start to an end of the inversion of the polarity to the other one. Thus, the parasitic capacitance can reduce the influence on image data that is output outside.

Furthermore, in the above first and second liquid crystal display devices, it is preferred that the drive part outputs the reset signal and the reading signal at a polarity in which a potential of the counter electrode is lower than a potential of the pixel electrode. This can suppress the reset of the capacitance by the reset signal from being insufficient.

Furthermore, in the above first and second liquid crystal display devices, the drive part can output the reset signal and the reading signal for each of the photodetection parts arranged in a horizontal direction, and the detection part can generate the image signal for each of the photodetective signals output from the photodetection parts arranged in the horizontal direction.

Embodiment

Hereinafter, a liquid crystal display device in an embodiment of the present invention will be described with reference to FIGS. 1 to 5. First, the configuration of the liquid crystal display device in the present embodiment will be described with reference to FIGS. 1 to 4.

FIG. 1 is a diagram schematically showing an entire configuration of a liquid crystal display device in an embodiment of the present invention. As shown in FIG. 1, the liquid crystal display device in the present embodiment includes an active matrix substrate 1, a counter substrate 2, and a liquid crystal layer (not shown) interposed between the two substrates. Furthermore, although not shown, the liquid crystal display device also includes a backlight device illuminating the two substrates and the liquid crystal layer.

The active matrix substrate 1 includes a glass substrate on which a number of sets of active elements and pixel electrodes are formed in a matrix. A region in which a plurality of pixels are placed in a matrix is a display area. In FIG. 1, the active elements and the pixel electrodes are not shown. One set of an active element and a pixel electrode constitutes one pixel. The active element is a thin film transistor (TFT) in the present embodiment.

Furthermore, the active matrix substrate 1 includes a gate driver 3 and a data driver 4 in regions around the display area. Each active element is connected to the gate driver 3 through a gate line GL extending in a horizontal direction, and is connected to the data driver 4 through a data line COL extending in a vertical direction (see FIG. 2).

In the present embodiment, wiring (not shown) for forming storage capacitors Cs (see FIG. 2) also is formed in the display area. Furthermore, in the present embodiment, the gate driver 3 and the data driver 4 also are formed of a silicon film monolithically in the same way as in the active elements on the glass substrate constituting the active matrix substrate 1.

The present embodiment is not limited thereto, and the gate driver 3 and the data driver 4 may be IC chips. In this case, the IC chip may be mounted directly on the glass substrate or mounted on an FPC connected to the active matrix substrate 1.

Furthermore, in the present embodiment, the liquid crystal display device further includes a control part 7 for driving the gate driver 3 and the data driver 4. The control part 7 is connected to an external appliance 8. The external appliance 8 is a computer, for example, in the case where the liquid crystal display device is used as a monitor of a computer. Furthermore, in the case where the liquid crystal display device is used as a display device for a mobile phone or a television, the external appliance 8 is a control substrate or the like for the mobile phone or the television. The external appliance 8 inputs video data to the control part 7.

The control part 7 inputs, for example, a gate start pulse, a clock signal, and a control signal to the gate driver 3. Then, the gate driver 3 selects active elements arranged in the horizontal direction through the gate line GL in synchronization with the timing of the dock signal. Furthermore, the control part 7 inputs video data, a control signal, and a clock signal to the data driver 4. The data deriver 4 latches the video data at a timing of the clock signal and writes the video data to each of the selected active elements through the data line COL. Due to such operations of the gate driver 3, the data driver 4, and the control part 7, each pixel is driven and, an image in accordance with a video signal is displayed.

The counter substrate 2 is placed so as to overlap the display area. The counter substrate 2 includes a counter electrode (not shown) and a color filter In the present embodiment, the color filter is composed of coloring layers of red (R), green (G), and blue (B) so as to correspond to the respective pixel electrodes. The constitution of the colors of the coloring layers of the color filter is not limited.

Furthermore, in order to add an image input function to the liquid crystal display device, the liquid crystal display device includes a plurality of photodetection parts (not shown in FIG. 1) that output photodetective signals in accordance with the amount of incident light, a sensor drive part 5 that drives the photodetection parts, and a detection part 6 that detects the photodetective signals output from the photodetection parts.

The photodetection parts are provided for each or at least two of the active elements in the display area of the active matrix substrate 1.

The sensor drive part 5 and the detection part 6 are formed in regions around the display area. In the present embodiment, the sensor drive part 5 and the detection part 6 are formed of a silicon film in a monolithically in the same way as in the active elements on the glass substrate constituting the active matrix substrate 1.

Figure 2:
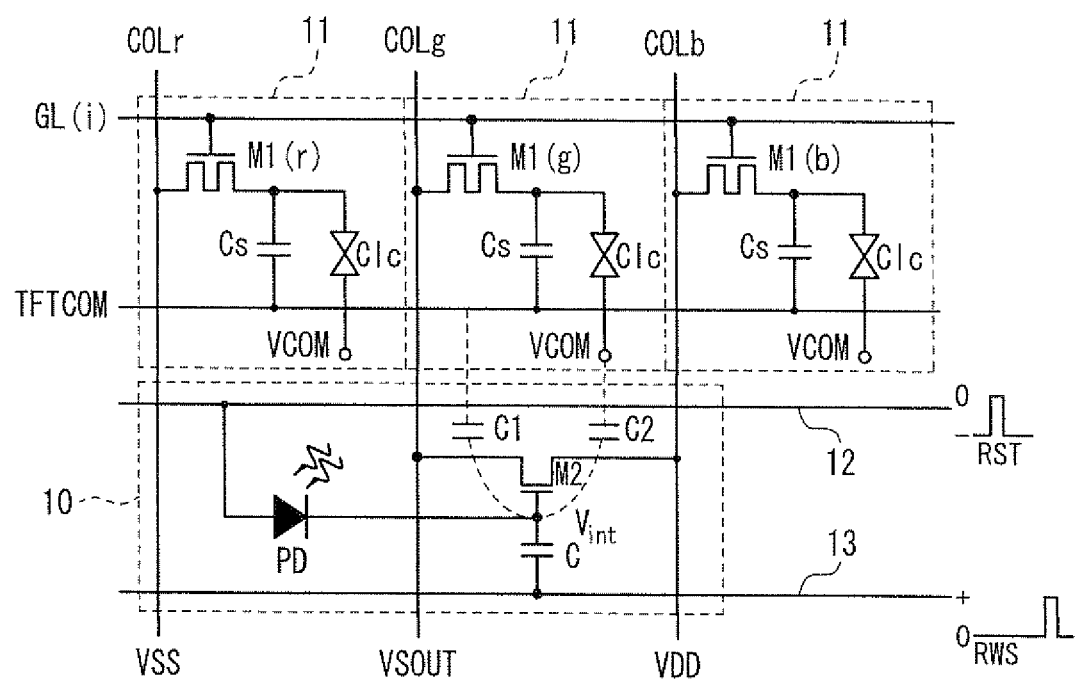
FIG. 2 is a circuit diagram showing a circuit configuration of pixels and photodetection parts of the liquid crystal display device shown in FIG. 1.

Herein, the configurations of the pixels and the photodetection parts will be described with reference to FIG. 2. FIG. 2 is a circuit diagram showing a circuit configuration of the pixels and the photodetection parts of the liquid crystal display device shown in FIG. 1. As shown in FIG. 2, each pixel 11 includes a transistor M1 as an active element. A gate terminal of the transistor M1 is connected to the gate line GL. Furthermore, a drain terminal (or a source terminal) of the transistor M1 is connected to the data line COL.

In the example shown in FIG. 2, three pixels 11 belonging to an i-th row from the top in the horizontal direction on the drawing surface are shown. "i" is any integer. Among the shown pixels, the pixel on the left side on the drawing surface is for a red color, the pixel in the middle on the drawing surface is for a green color, and the pixel on the right side on the drawing surface is for a blue color. On the counter substrate 2, the coloring layers of red (R), green (G), and blue (B) are provided so as to correspond to the respective pixels.

M1(r), M1(g), and M1(b) indicate what color of pixel each transistor M1 constitutes. GL(i) represents a gate line in the i-th row. Furthermore, COLr represents a data line to which red video data is output. COLg represents a data line to which green video data is output. COLb represents a data line to which blue video data is output.

Furthermore, as shown in FIG. 2, the pixel electrode in each pixel 11 forms a pixel capacitor Clc (see FIG. 2) using the liquid crystal layer as a dielectric, together with the counter electrode of the counter substrate 2 (see FIG. 1). Thus, when the gate driver 3 selects a gate line GL, and the data driver 4 outputs video data to the data line COLr, COLg, and COLb, charge is stored in the pixel capacitors Clc in accordance with the video data in the selected row. Then, the transmittance of illumination light transmitted through the liquid crystal layer changes in accordance with the stored charge, whereby a video is displayed.

In the liquid crystal display device, in order to prevent burning of liquid crystal, inversion driving of inverting the polarity of a voltage to be applied to the liquid crystal layer for each predetermined period is performed. Specifically, a voltage (counter electrode voltage) VCOM applied to the counter electrode is switched for each horizontal period (see FIG. 5).

Furthermore, as shown in FIG. 2, the photodetection part 10 includes a photodiode PD, a capacitance C, and a transistor M2. In the present embodiment, one photodetection part 10 is provided for three pixels of red, green and blue. The photodiode PD receives light incident through the counter substrate 2 and the liquid crystal layer and outputs an electric signal in accordance with the amount of received light. In the present embodiment, a PIN diode is used as the photodiode PD. The configuration of the photodiode PD will be described later using FIG. 3.

Charge is stored in the capacitance C in accordance with the electric signal output from the photodiode PD. The charge stored in the capacitance C is reset by a reset signal RST output from the sensor chive part 5. The photodetection part 10 outputs a photodetective signal VSOUT whose level varies depending upon the amount of the stored charge. The start and stop of an output of the photodetective signal VSOUT are conducted by the transistor M2 based on a reading signal RWS output from the sensor drive part 5.

Specifically, as shown in FIG. 2, an anode of the photodiode PD is connected to one terminal of the capacitance C, and a cathode of the photodiode PD is connected to wiring 12 through which the reset signal RST is output. The other terminal of the capacitance C is connected to wiring 13 through which the reading signal RWS is output. Furthermore, a gate terminal of the transistor M2 is connected so as to be divided from the wiling connecting the anode of the photodiode PD to one terminal of the capacitance C.

Furthermore, a source (or a drain) of the transistor M2 is connected to the data line COLb, and the drain (or the source) of the transistor M2 is connected to the data line COLg. The data line COLb also is used for applying a supply voltage VDD to the source (or the drain) of the transistor M. The data line COLg also is used as output wiring of the photodetective signal VSOUT. In FIG. 2, the capacitances C1 and C2 represent parasitic capacitances which the photodetection parts form together with the pixels and the counter substrate.

When a reset signal (level: 0[V]) is input in the photodetection part 10 with the circuit shown in FIG. 2, $V_{int}$ becomes 0[V], and the charge stored in the capacitance C is reset. After that, a negative voltage is applied to the cathode of the photodiode PD through the wiring 12 and light is incident upon the photodiode PD, charge is stored in the capacitance C and $V_{int}$ drops. When a reading signal (level: 8[V]) is input in this state, the voltage of $V_{int}$ rises rapidly to a threshold value of the transistor M2 or higher to become a voltage in accordance with the amount of the charge stored in the capacitance C. As a result, a channel of the transistor M2 is opened, and a current in accordance with the voltage of $V_{int}$ that has risen flows. This current becomes the photodetective signal VSOUT.

Furthermore, although not shown in FIGS. 1 and 2, the detection part 6 includes a sampling circuit and an amplifier circuit. The detection part 6 converts the photodetective signal VSOUT into a voltage signal, and furthermore, amplifies the voltage signal to generate an image signal VOUT. The image signal VOUT is output from the detection part 6 to the control part 7, and thereafter, output to the external appliance 8. As described later, in the present embodiment, the sensor drive part 5 outputs the reset signal RST and the reading signal RWS for each of the photodetection parts 10 arranged in the horizontal direction. Therefore, the detection parts 6 generate the image signal VOUT for each of the photodetective signals output from the photodetection parts 10 arranged in the horizontal direction.

Figure 3:
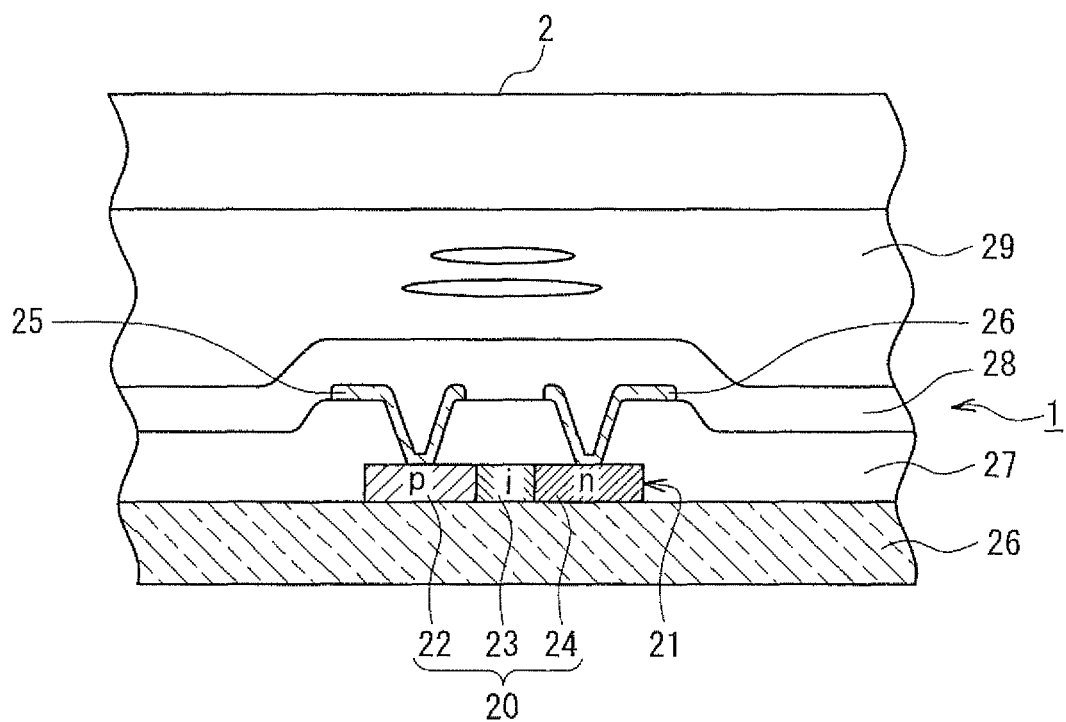
FIG. 3 is a cross-sectional view showing a specific configuration of a photodiode constituting the photodetection part of the liquid crystal display device shown in FIG. 1.

Herein, the specific configuration of the photodiode used in the present embodiment will be described with reference to FIG. 3. FIG. 3 is a cross-sectional view showing a specific configuration of the photodiode constituting the photodetection part of the liquid crystal display device shown in FIG. 1.

As shown in FIG. 3, in the present embodiment, the photodiode 20 is a PIN diode having a lateral structure. The photodiode 20 includes a silicon film 21 provided on a glass substrate 26 to be a base substrate of the active matrix substrate 1.

The silicon film 21 constituting the photodiode 20 is formed simultaneously with the transistors M1 and M2 (see FIG. 2), using the step of forming the transistors M1 and M2. In the present embodiment, the silicon film 21 and the silicon film forming the transistors M1 and M2 are formed by Continuous Grain Silicon (CGS) excellent in the moving speed of charge. Furthermore, a p-type semiconductor region (p-layer) 22, a genuine semiconductor region (i-layer) 23, and an n-type semiconductor region (n-layer) 24 are provided in the silicon film 21 in this order in a plane direction.

In the photodiode 20, the i-layer 23 functions as a photodetective region. In the present embodiment, the i-layer 23 may be a region closer to an electrically neutrality, compared with the adjacent p-layer 22 and n-layer 24. It is preferred that i-layer 23 is a region including no impurities or a region in which a conduction electron density is equal to a hole density.

Furthermore, the photodiode 20 is covered with inter-layer insulating films 27 and 28. In FIG. 3, reference numeral 25 denotes wiring connected to the p-layer 22, and 26 denotes wiring connected to the n-layer 24. Reference numeral 29 denotes the liquid crystal layer. Regarding the counter substrate 2, only an outer shape is shown.

Figure 4:
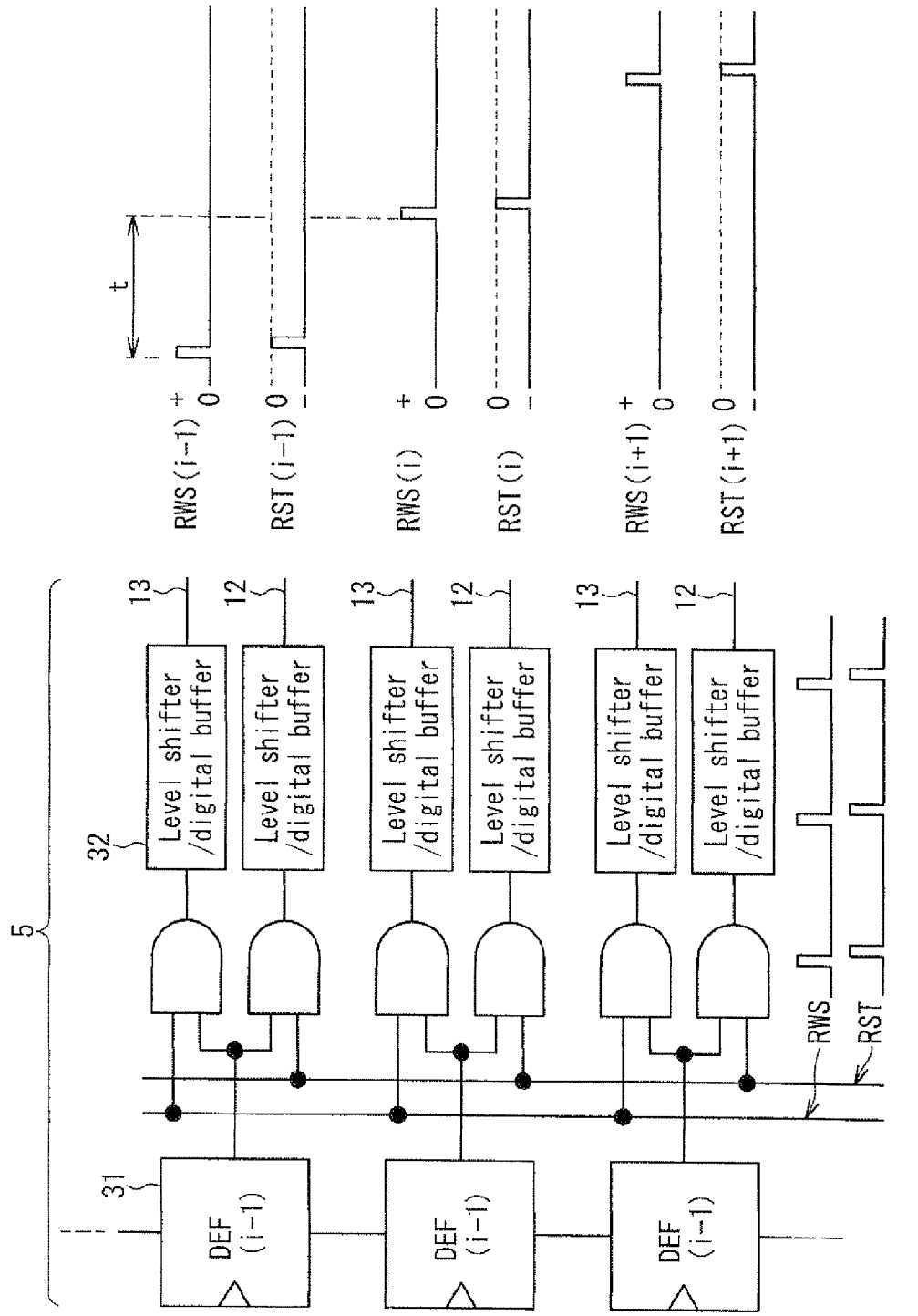
FIG. 4 is a circuit diagram showing a circuit configuration of a sensor drive part provided in the liquid crystal display device shown in FIG. 1.

Furthermore, the configuration of the sensor drive part 5 used in the present embodiment will be described with reference to FIG. 4. FIG. 4 is a circuit diagram showing a circuit configuration of the sensor drive part of the liquid crystal display device shown in FIG. 1. In the present embodiment, the sensor drive part 5 outputs the reset signal RST and the reading signal RWS for each of the photodetection parts 10 (see FIG. 2) arranged in the horizontal direction. As shown in FIG. 4, the sensor drive part 5 includes shift registers 31 and level shifters/digital buffers 32.

The sensor drive part 5 selects the wirings 12 and 13 at a preset time interval t, using the shift registers 31 and the level shifters/digital buffers 32, and outputs the reset signal RST and the reading signal RWS at the set timing. Thus, the row of the photodetection parts 10 that output the photodetective signal VSOUT is selected from the photodetection parts 10 provided in the display area, and the photodetective signal VSOUT is output from the photodetection parts 10 belonging to the selected row.

Furthermore, in the present embodiment, the operation of the sensor drive part 5 is controlled by the control part 7. That is, the control part 7 inputs a start pulse, a dock signal, and a control signal to the sensor drive part 5 in the same way as in the gate driver 3. Thus, the sensor drive part 5 selects the wiring 12 and the wiring 13 at a time indicated by the control signal in synchronization with the timing of the clock signal.

Figure 5:
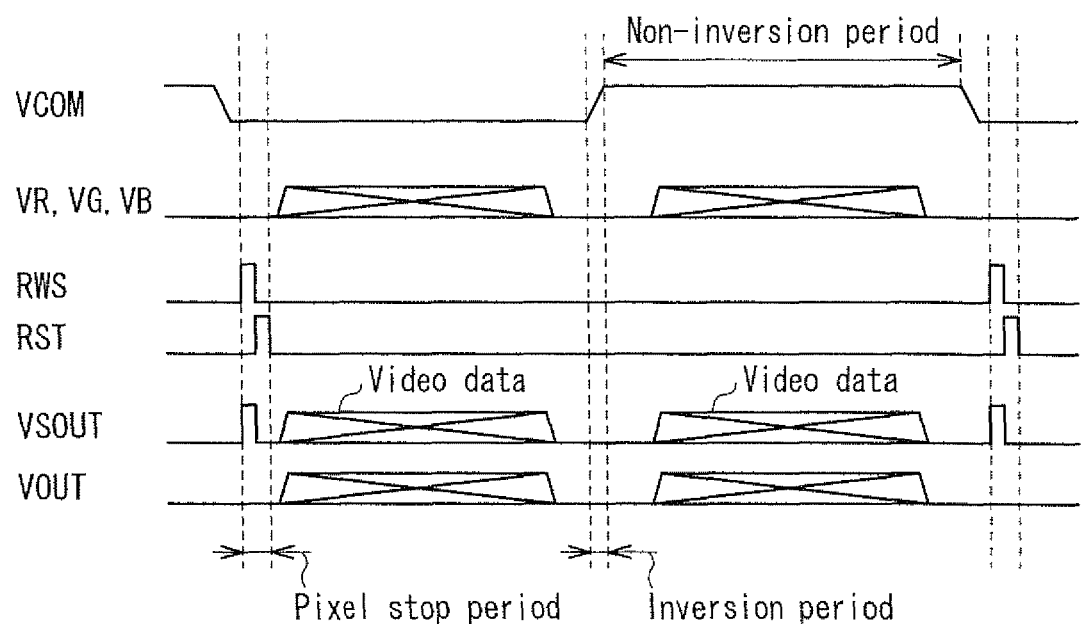
FIG. 5 is a timing chart showing the timing of an input/output of a signal in the liquid crystal display device shown in FIG. 1.

Next, the operation of the liquid crystal display device in the present embodiment will be described with reference to FIG. 5. FIG. 5 is a timing chart showing a timing of an input/output of a signal in the liquid crystal display device shown in FIG. 1. In the following description of FIG. 5, FIGS. 1 and 2 will be referred to, if required.

As shown in FIG. 5, in the present embodiment, the polarity of a voltage applied to the liquid crystal layer is inverted for each horizontal period, so that the potential of the voltage VCOM of the counter electrode is switched. In such a case, when the photodetection parts 10 (see FIG. 2) are operated ignoring the timing of polarity inversion, the stored charge in the storage capacitor Cs, the pixel capacitor Clc, and the capacitance C are influenced by the fluctuation in charge stored in the parasitic capacitances C1 and C2 to be fluctuated. Such a fluctuation may degrade the image quality of a display image and a captured image.

In order to reduce the influence by the parasitic capacitances C1 and C2, the sensor chive part 5 outputs the reset signal RST and the reading signal RWS to the respective photodetection parts 10 in the case where the polarity is set to be a predetermined one, i.e., only in the case where VCOM is high or low.

In the present embodiment, the reset signal RST is input directly to the photodiode PD, and furthermore, the high level thereof is set to be 0[V]. When the reset signal RST is input at a time when the voltage VCOM of the counter electrode is at a high level, the reset of the capacitance C may be insufficient. Therefore, in the present embodiment, as shown in FIG. 5, it is preferred that the reset signal RST and the reading signal RWS are output in the case where the potential of the counter electrode is lower than that of the pixel electrodes, i.e., in the case where the voltage VCOM of the counter electrode is at a low level.

Furthermore, it is preferred that the sensor drive part 5 outputs the reset signal RST and the reading signal RWS to the respective photodetection parts 10 during a period (pixel stop period) in which a current supplied to the transistor M1 constituting a pixel does not vary after the completion of the polarity inversion. The reason for this is as follows: when the reset signal RST and the reading signal RWS are output during the period other than the pixel stop period, the fluctuation in the parasitic capacitance C1 adversely influences the storage capacitor Cs and the capacitance C, and the quality of a display image and a captured image are likely to decrease.

Furthermore, the parasitic capacitance C2 is fluctuated particularly during the period (inversion period) from the start of the polarity inversion to the end thereof, and the fluctuation in the parasitic capacitance C2 adversely influences the gate terminal of the transistor M2 constituting the photodetection part 10. Thus, in the present embodiment, it is preferred that the sensor drive part 5 outputs the reset signal RST and the reading signal RWS so that the output of the photodetective signal VSOUT is completed before overlapping the inversion period.

In the present embodiment, the photodetective signal VSOUT is output from the photodetection part 10 substantially simultaneously with the output of the reading signal RWS. Thus, the photodetective signal VSOUT also is output during the pixel stop period, and is completed before the start of the inversion period.

Furthermore, as shown in FIG. 2, in the present embodiment, the photodetective signal VSOUT is output using the data line. Thus, after the output of the photodetective signal VSOUT is completed, video data is output from the data driver 4. FIG. 5 also shows this point. In FIG. 5, "VR, VG, VB" represent the video data input to the data driver 4 through the control part 7 from the external appliance 8.

Furthermore, in the present embodiment, the detection part 6 to which the photodetective signal VSOUT is input is formed on the active matrix substrate 1, so that the fluctuation in the parasitic capacitance C2 adversely influences the pixel signal VOUT output from the detection part 6. Thus, as shown in FIG. 5, it is preferred that the detection part 6 outputs the video signal VOUT to the external appliance 8 during the period not overlapping the inversion period.

As described above, in the liquid crystal display device in the present embodiment, the drive of the photodetection parts 10 is limited in such a manner that the parasitic capacitances C1 and C2 formed by the photodetection parts 10 do not adversely influence the pixels and the photodetection parts 10. A display image displayed by the liquid crystal display device and a captured image in Embodiment 1 have image quality more excellent than that of the conventional example.

INDUSTRIAL APPLICABILITY

The present invention has industrial applicability as a liquid crystal display device that provides image quality improved in both a display image and a captured image.

The invention claimed is:

1. A liquid crystal display device comprising:
    an active matrix substrate on which a plurality of sets of active elements and pixel electrodes are placed in a matrix,
    a counter substrate on which a counter electrode is placed, and a liquid crystal layer interposed between the two substrates, and the display device adapted for inversion driving in which a polarity of a voltage applied to the liquid crystal layer is inverted for each predetermined period,
    a photodetection part provided on the active matrix substrate for each of at least two of the active elements, and a drive part,
    wherein the photodetection part includes a photodiode that receives light incident through the counter substrate and the liquid crystal layer and outputs an electric signal in accordance with an amount of the received light, and a capacitance that stores charge in accordance with the electric signal, and outputs a photodetective signal whose level changes in accordance with an amount of the stored charge, and
        the drive part outputs, to each photodetection part, a reset signal that resets the charge stored in the capacitance and a reading signal that causes the photodetection part to output the photodetective signal during a period in which the polarity is set to be a predetermined one, wherein the reset signal and reading signal are output by the drive part during a time period which is (i) after inversion of the polarity occurs, and (ii) prior to video data being output to a corresponding active element for display before another inversion.

2. The liquid crystal display device according to claim 1, wherein the drive part further outputs the reset signal and the reading signal to each photodetection part so that an output of the photodetective signal from the photodetection part is completed before the inversion of the polarity to the other one is started.

3. The liquid crystal display device according to claim 1, further comprising a detection part that is provided on the active matrix substrate and detects the photodetective signal output from the photodetection part,
    wherein the detection part generates an image signal from the detected photodetective signal, and outputs the image signal to an external appliance during a period that does not overlap a period from a start to an end of the inversion of the polarity to the other one.

4. The liquid crystal display device according to claim 1, wherein the drive part outputs the reset signal and the reading signal at a polarity in which a potential of the counter electrode is lower than a potential of the pixel electrode.

5. The liquid crystal display device according to claim 1, wherein the drive part outputs the reset signal and the reading signal for each of the photodetection parts arranged in a horizontal direction, and
    the detection part generates the image signal for each of the photodetective signals output from the photodetection parts arranged in the horizontal direction.

6. A liquid crystal display device comprising an active matrix substrate on which a plurality of active elements are placed in a matrix, a counter substrate opposed to the active matrix substrate, and a liquid crystal layer interposed between the two substrates, and performing inversion driving in which a polarity of a voltage applied to the liquid crystal layer is inverted for each predetermined period, the liquid crystal display device comprising
    a photodetection part provided on the active matrix substrate for each or at least two of the active elements, and a drive part,
    wherein the photodetection part includes a photodiode that receives light incident through the counter substrate and the liquid crystal layer and outputs an electric signal in accordance with an amount of the received light, and a capacitance that stores charge in accordance with the electric signal, and outputs a photodetective signal whose level changes in accordance with the amount of the stored charge, and the drive part outputs, to each photodetection part, a reset signal that resets the charge stored in the capacitance and a reading signal that causes the photodetection part to output the photodetective signal so that, when the polarity is set to be a predetermined one, an output of the photodetective signal from the photodetection part is completed before the inversion of the polarity to the other one is started, and wherein the reset signal and reading signal are output by the drive part during a time period which is (i) after inversion of the polarity occurs, and (ii) prior so video data being output to a corresponding active element for display before another inversion.

7. The liquid crystal display device according to claim 6, further comprising a detection part that is provided on the active matrix substrate and detects the photodetective signal output from the photodetection part, wherein the detection part generates an image signal from the detected photodetective signal, and outputs the image signal to an external appliance during a period that does not overlap a period from a start to an end of the inversion of the polarity to the other one.

8. The liquid crystal display device according to claim 6, wherein the drive part outputs the reset signal and the reading signal at a polarity at which a potential of the counter electrode is lower than a potential of the pixel electrode.

9. The liquid crystal display device according to claim 6, wherein the drive part outputs the reset signal and the reading signal for each of the photodetection parts arranged in a horizontal direction, and the detection parts generate the image signal for each of the photodetective signals output from the photodetection parts arranged in the horizontal direction.

* * * * *